United States Patent
Chen et al.

(10) Patent No.: US 8,839,188 B2
(45) Date of Patent: Sep. 16, 2014

(54) AUTOMATED BUILD PROCESS AND ROOT-CAUSE ANALYSIS

(75) Inventors: Guoyou Chen, Austin, TX (US); Rajya Lakshmi Devi Marathu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/110,491

(22) Filed: May 18, 2011

(65) Prior Publication Data

US 2012/0297359 A1    Nov. 22, 2012

(51) Int. Cl.
```
G06F 9/44      (2006.01)
G06F 11/00     (2006.01)
G06F 12/14     (2006.01)
G06F 12/16     (2006.01)
G08B 23/00     (2006.01)
```

(52) U.S. Cl.
USPC ........... 717/104; 717/100; 717/101; 717/102; 717/108; 717/115; 717/120; 717/122; 717/123; 717/124; 717/126; 717/168; 717/177; 726/22

(58) Field of Classification Search
None
See application file for complete search history.

(56) References Cited

U.S. PATENT DOCUMENTS

| | | | |
|---|---|---|---|
| 6,035,295 A | | 3/2000 | Klein |
| 6,457,170 B1 | | 9/2002 | Boehm et al. |
| 7,594,219 B2 * | | 9/2009 | Ramachandran et al. .... 717/124 |
| 7,640,533 B1 * | | 12/2009 | Lottero et al. ............... 717/108 |
| 7,757,212 B2 | | 7/2010 | Wagner et al. |
| 8,037,453 B1 * | | 10/2011 | Zawadzki ..................... 717/123 |
| 8,225,281 B1 * | | 7/2012 | Hardinger et al. ............ 717/120 |
| 2003/0046681 A1 * | | 3/2003 | Barturen et al. .............. 717/177 |
| 2003/0177473 A1 * | | 9/2003 | Banerjee et al. .............. 717/115 |
| 2004/0060035 A1 * | | 3/2004 | Ustaris ......................... 717/100 |
| 2004/0230964 A1 * | | 11/2004 | Waugh et al. ................. 717/168 |
| 2004/0261055 A1 | | 12/2004 | Bertelrud et al. |
| 2005/0044531 A1 * | | 2/2005 | Chawla et al. ................ 717/122 |
| 2005/0081186 A1 * | | 4/2005 | Tigani et al. .................. 717/101 |
| 2005/0240903 A1 * | | 10/2005 | Lake ............................. 717/124 |
| 2006/0230449 A1 * | | 10/2006 | Fox et al. ........................ 726/22 |
| 2007/0061782 A1 * | | 3/2007 | Schreiner et al. ............. 717/124 |
| 2009/0070734 A1 * | | 3/2009 | Dixon et al. .................. 717/102 |
| 2010/0050156 A1 * | | 2/2010 | Bonanno et al. .............. 717/122 |
| 2010/0058294 A1 * | | 3/2010 | Best et al. ..................... 717/122 |
| 2011/0055799 A1 * | | 3/2011 | Kaulgud et al. .............. 717/101 |
| 2011/0239195 A1 * | | 9/2011 | Lin et al. ....................... 717/126 |
| 2012/0079447 A1 * | | 3/2012 | Arnott et al. ................. 717/101 |

* cited by examiner

*Primary Examiner* — Don Wong
*Assistant Examiner* — Anibal Rivera
(74) *Attorney, Agent, or Firm* — Yee & Associates, P.C.; Parashos Kalaitzis

(57) ABSTRACT

A method, executed by a processor, for automatically integrating tracks into a software build receives a track to be integrated and determines if all tracks dependent upon the received track have been integrated into the software build. If all tracks dependent upon the received tracks are determined to have been integrated, the method automatically creates build scripts according to the received track. If not all tracks dependent upon the received tracks are determined to have been integrated, the method notifies owners of the received track and any unintegrated dependent tracks. The method automatically starts build processes according to the build scripts. If all the build processes are successful, the method marks the received track and all the dependent tracks as good and ready for a product build.

20 Claims, 4 Drawing Sheets

AUTOMATED BUILD PROCESS AND ROOT-CAUSE ANALYSIS

BACKGROUND

The present invention relates generally to the field of software build automation, and more particularly to methods, systems, and computer program products that automatically determine, when a track is received for integration, if all dependent tracks have been integrated previously, automatically create and build scripts including the received track and all dependent tracks, and automatically perform root-cause analysis in the event of a build failure.

During a software product build process, some tracks are often defective, which causes the build process to fail. It is very time consuming to determine which track or tracks caused the build process to fail. It is further time consuming to re-run the build process after the defective tracks are corrected or removed.

Currently, software developers are asked to perform a manual build before submitting tracks for integration. However, many developers omit the manual build, particularly if they deem the changes in the code to be so minor as not to cause a build failure. Accordingly, build failures occur all too often.

BRIEF SUMMARY

Embodiments of the present invention provide methods, systems, and computer program products for automatically integrating tracks into a software build. In one embodiment, a method receives a track to be integrated into the software build. The method determines if all tracks dependent upon the received track have been integrated into the software build. If all tracks dependent upon the received tracks are determined to have been integrated, the method automatically creates build scripts according the received track. If not all tracks dependent upon the received tracks are determined to have been integrated, the method notifies owners of the received track and any unintegrated dependent track that there are unintegrated dependent tracks.

The method automatically starts build processes according to the build scripts. If all the build processes are successful, the method marks the received track and all the dependent tracks as good and ready for a product build. If not all the build processes are determined to be successful, the method automatically performs root-cause analysis to determine which of the tracks caused a build to fail, automatically marks the track or tracks that caused the build to fail as bad and not integrated. The method automatically notifies an owner of the track or tracks that caused the build to fail of the results of the root-cause analysis.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
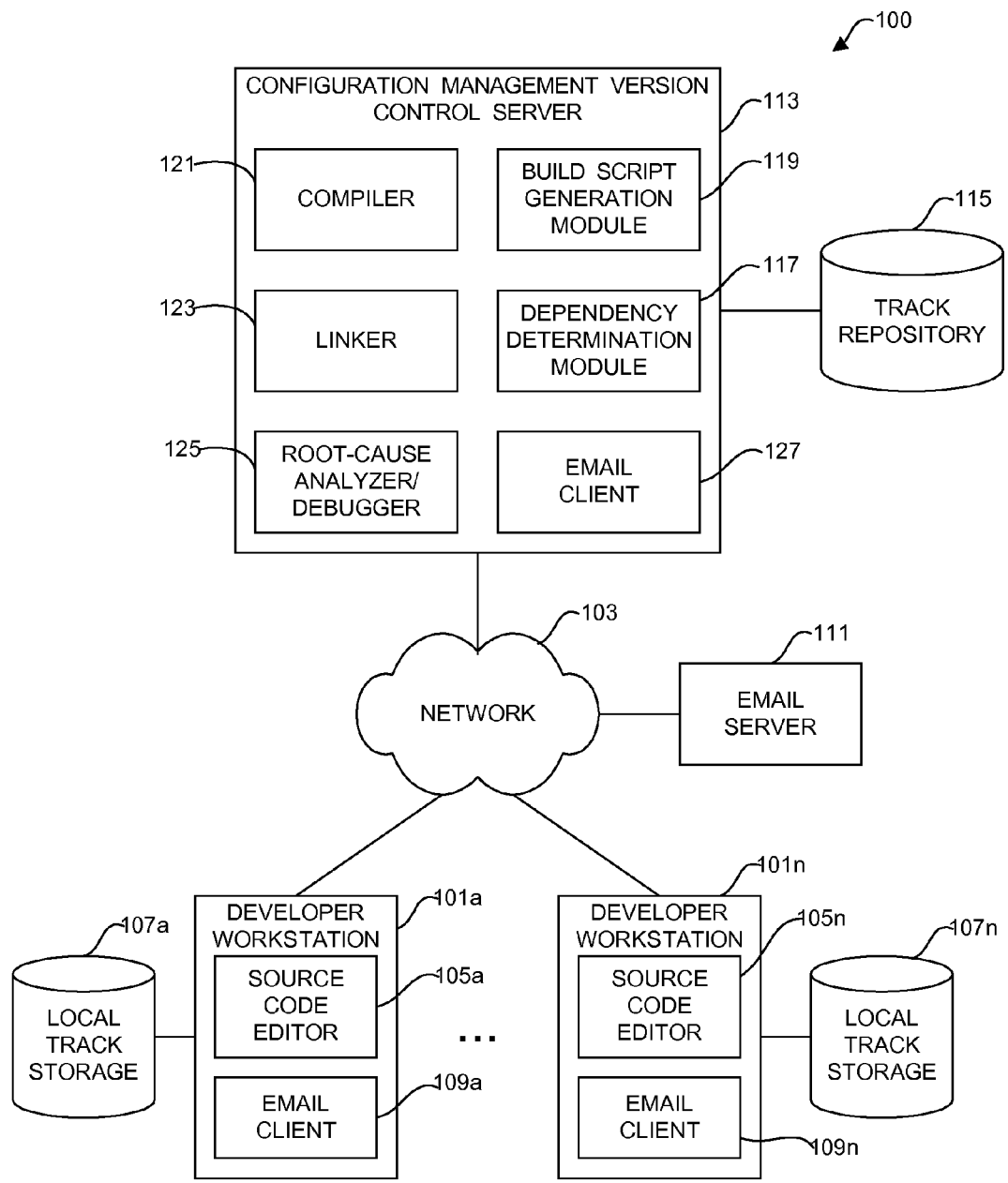
FIG. 1 is a block diagram of an embodiment of a system according to the present invention.

Referring now to the drawings, and first to FIG. 1, a system is designated generally by the numeral 100. System 100 includes a plurality of developer workstations 101 connected to a network 103. Developer workstations 101 may be personal computers or other computing devices. Network 103 may any of several computer networks, such as a local area network (LAN).

Each developer workstation 101 includes, among other things, a source code editor 105, which enables a developer to create and edit source code tracks, which may be stored in local track storage 107. Each developer workstation 103 also includes an email client 109, which enables a developer to send email to, and receive email from, an email server 111 connected to network 103. Each developer workstation 103 is associated with the owner or owners of one or more source code tracks.

System 100 includes an embodiment of a configuration management version control (CMVC) server 113 connected to network 103. CMVC server 113 is implemented in a computer. CMVC server 113 receives tracks from developer workstations 101 and performs software build integration processing according to the present invention. CMVC server 113 stores tracks that are integrated into a software build in a track repository 115.

CMVC server 113 includes dependency determination module 117. When CMVC server 113 receives a track from a developer workstation, dependency determination module 117 automatically determines if all tracks that are dependent upon the received track have been previously integrated into the software build. CMVC server 113 includes a build script generation module 119, which is configured automatically to generate build scripts when dependency determination module 117 determines that all tracks that are dependent upon the received track have been previously integrated. CMVC server 113 runs build scripts generated by build script generation module by passing tracks to a compiler 121 and a linker 123. If a build according to a build script is successful, CMVC server 113 integrates the tracks of the build into track repository 115.

CMVC server 113 includes a root-cause analyzer/debugger 125. If a build according to a build script fails, root-cause analyzer/debugger 125 automatically determines the cause or causes of the build failure. CMVC server 113 includes an email client 127, which CMVC server 113 uses to send automatic email notifications to the owner or owners of the track or tracks that caused the build to fail. The email notifications include the results of the root-cause analysis performed by root-cause analyzer/debugger 125, to the owner or owners to correct defects in the bad tracks. CMVC server 113 also uses email client 127 to send automatic email notifications whenever dependency determination module 117 determines that not all tracks that depend on the received track have been previously integrated into a software build.

Figure 2:
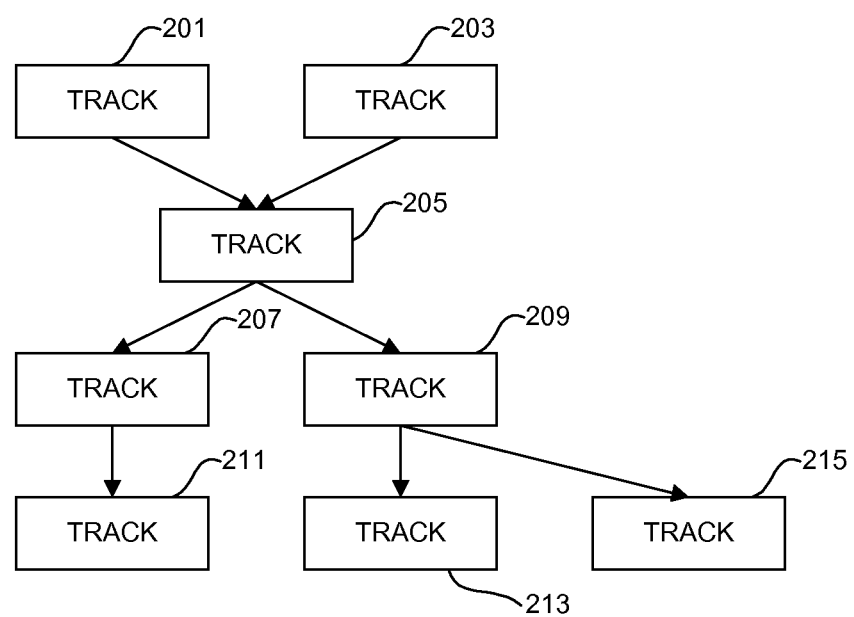
FIG. 2 is a pictorial representation of track dependency.

FIG. 2 is a directed graphical representation of track dependency. Track 211 is dependent upon track 207. Tracks 213 and 215 are each dependent upon track 207. Tracks 207 and 209 are each dependent upon track 205. Track 205 is dependent upon track 203. Track 205 is also dependent upon track 201. Dependency determination module 117 of FIG. 1 determines if all tracks that are dependent upon a track received for integration have previously been integrated.

Figure 3:
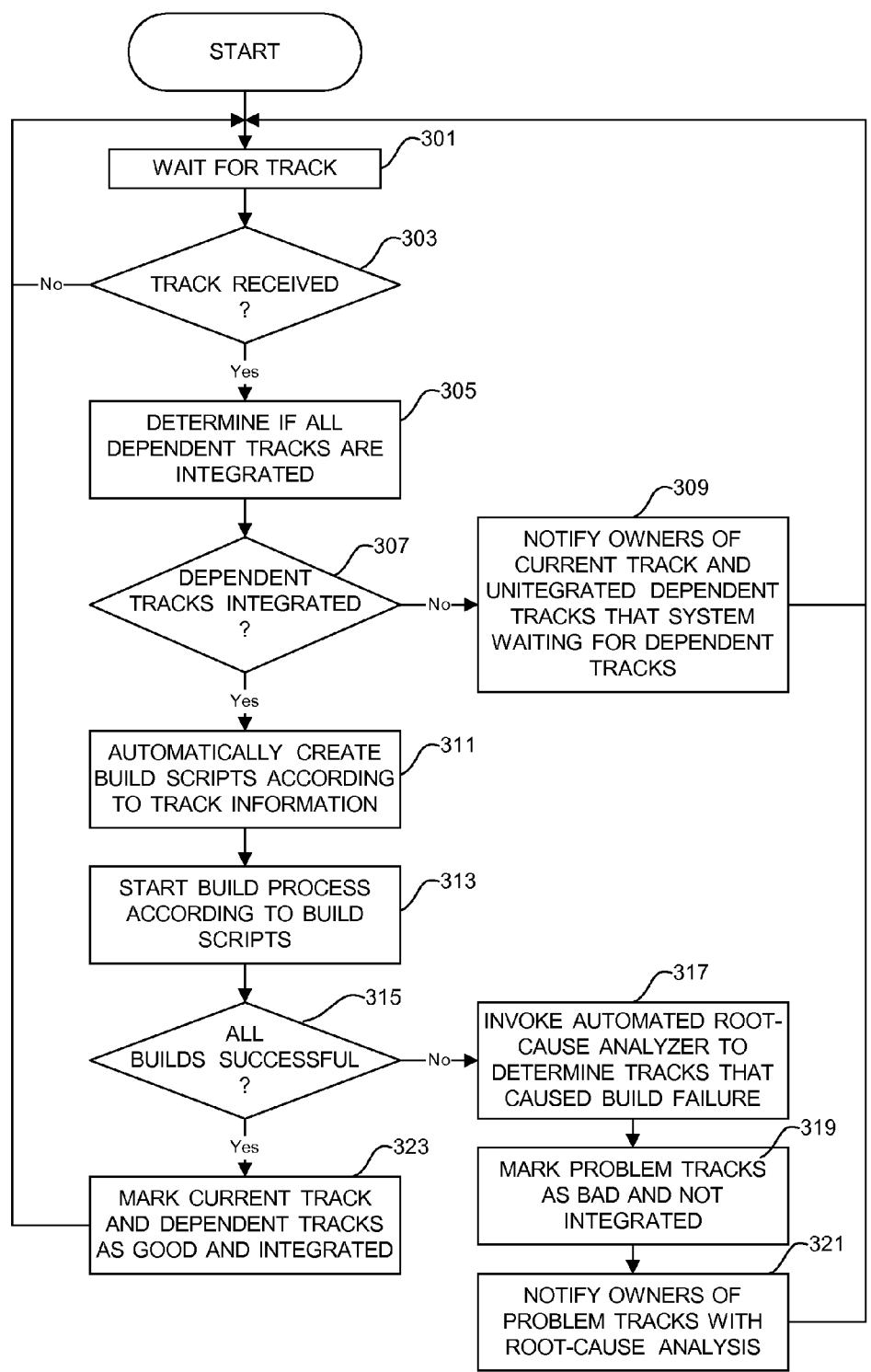
FIG. 3 is a flowchart of an embodiment of a method according to the present invention; and, FIG. 4 is a block diagram of a computing device in which features of the present invention may be implemented.

FIG. 3 is a flowchart of an embodiment of CMVC server 113 processing according to the present invention. CMVC server 113 waits for a track at block 301. When, as determined at decision block 303, the system receives a track, the system automatically determines, at block 305, if all tracks dependent upon the received track are integrated. If, as determined at decision block 307, all dependent tracks have not been integrated, the system automatically notifies the owner of the current track and any unintegrated dependent tracks that the system is waiting for dependent tracks, at block 309, and processing returns to block 301 to wait for a track. If, as determined at decision block 307, all dependent tracks have been integrated, the system automatically creates build scripts according to the current track and its dependent tracks, at block 311. Then the system automatically starts a build process according to the build scripts, at block 313. At the end of the build process, the system determines, at decision block 315, if all builds are successful. If not all builds are successful, the system invokes root-cause analyzer/debugger 125 to determine the track or tracks that caused the build to fail, at block 317. The system marks the problem tracks as bad and not integrated, at block 319, and notifies the owners of the problem tracks of the results of the root-cause analysis, at block 321. Then processing returns to block 301. If, as determined at decision block 315, all builds are successful, the system marks the current track and its dependent tracks as good and ready for the official product build, at block 323. Then processing returns to block 301.

Figure 4:
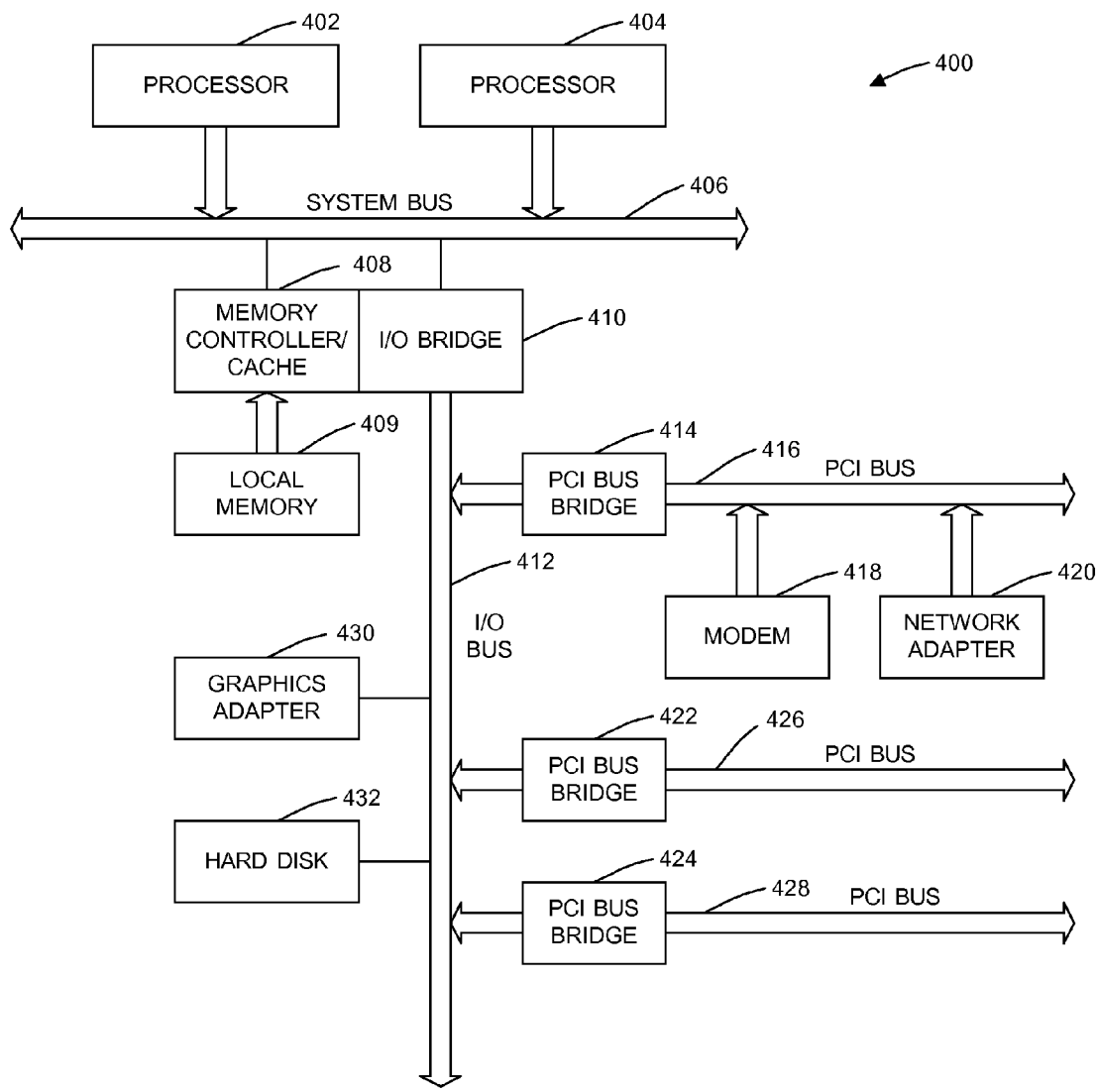

FIG. 4 is a block diagram of a data processing system upon which embodiments of the present invention may be implemented. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to networks may be provided through a modem 418 or a network adapter 420 connected to PCI local bus 416 through add-in boards. Additional PCI bus bridges 422 and 424 provide interfaces for additional PCI local buses 426 and 428, respectively, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM® eServer™ pSeries system, a product of International Business Machines Corporation in Armonk, New York, running the Advanced Interactive Executive (AIX™) operating system or LINUX operating system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method, comprising:
    receiving, at a configuration management control server, a track to be integrated into a software build, wherein the received track is a current track and a source code track previously stored in local track storage;
    determining, using a dependency determination module, at the configuration management control server, and a track repository containing received tracks which were integrated previously, if all tracks dependent upon said received track have been marked as good and integrated in the track repository; and,
    if all tracks dependent upon said received track are determined to have been marked as good and integrated in the track repository, automatically creating build scripts by the configuration management control server according to said current track and its dependent tracks.

2. The method as claimed in claim 1, further comprising automatically starting a build process according to said build scripts.

3. The method as claimed in claim 2, further comprising determining if all said build processes are successful.

4. The method as claimed in claim 3, wherein if all said build processes are successful, marking said received track and all said dependent tracks as good and integrated in the track repository ready for a product build.

5. The method as claimed in claim 3, wherein if not all said build processes are determined to be successful:
    automatically determining which track caused the build to fail; and,
    automatically marking a particular track determined to cause said build to fail as bad and not integrated.

6. The method as claimed in claim 5, wherein said automatically determining which track caused said build to fail further comprises:
    invoking root-cause analysis, and
    automatically notifying an owner of said particular track determined to cause said build to fail of results of said root-cause analysis.

7. The method as claimed in claim 1, wherein if not all tracks dependent upon said received track are determined to have been integrated, notifying owners of said received track and any unintegrated dependent track that there is an unintegrated dependent track.

8. A computer program product comprising:
    a non-transitory computer readable storage device having computer readable instructions stored thereon for execution by a computer, wherein the computer readable instructions comprise:
    computer readable instructions for receiving a track, at a configuration management control server, to be integrated into a software build, wherein the received track is a current track and a source code track previously stored in local track storage;

computer readable instructions for determining, using a dependency determination module, at the configuration management control server, and a track repository containing received tracks which were integrated previously, if all tracks dependent upon said received track have been marked as good and integrated in the track repository; and, computer readable instructions for, automatically creating build scripts by the configuration management control server according to said current track and its dependent tracks if all tracks dependent upon said received track are determined to have been marked as good and integrated in the track repository.

9. The computer program product as claimed in claim 8, further comprising computer readable instructions for automatically starting a build process according to said build scripts.

10. The computer program product as claimed in claim 9, further comprising computer readable instructions for determining if all said build processes are successful.

11. The computer program product as claimed in claim 10, further comprising computer readable instructions for marking said received track and all said dependent tracks as good and integrated in the track repository, ready for a product build if all said build processes are successful.

12. The computer program product as claimed in claim 10, further comprising:

computer readable instructions for automatically determining which track caused a build to fail if not all said build processes are determined to be successful; and, computer readable instructions for automatically marking a particular track determined to cause said build to fail as bad and not integrated.

13. The computer program product as claimed in claim 12, wherein said computer readable instructions for automatically determining which track caused said build to fail further comprises:

computer readable instructions for invoking root-cause analysis, and computer readable instructions for automatically notifying an owner of said particular track determined to cause said build to fail of results of said root-cause analysis.

14. The computer program product as claimed in claim 8, further comprising computer readable instructions for notifying owners of said received track and any unintegrated dependent track that there is an unintegrated dependent track if not all tracks dependent upon said received track are determined to have been integrated.

15. A system, comprising:

a server machine, wherein said server machine is a configuration management control server, said server machine including:

a dependency determination module using a track repository containing received tracks which were integrated previously, to determine automatically if all tracks dependent upon a track received from a developer machine have been marked as good and integrated in the track repository, wherein the track received is a current track and a source code track previously stored in local track storage; and, a build script generation module to create automatically build scripts, by the server machine, according to said current track and its dependent tracks if all tracks dependent upon said received track are determined to have been marked as good and integrated in the track repository.

16. The system as claimed in claim 15, wherein said server machine automatically starts a build process according to said build scripts.

17. The system as claimed in claim 16, wherein said server machine determines if all said build processes are successful.

18. The system as claimed in claim 17, wherein said server machine marks said received track and all said dependent tracks as good and integrated, in the track repository, ready for a product build if all said build processes are successful.

19. The system as claimed in claim 17, wherein said server machine determines which track caused a build to fail if not all said build processes are determined to be successful; and, marks a particular track determined to cause said build to fail as bad and not integrated.

20. The system as claimed in claim 19, wherein said server machine notifies an owner of said particular track determined to cause said build to fail of an analysis of a cause of said build to fail.

* * * * *